United States Patent [19]  [11] 4,046,964
Daugherty et al.  [45] Sept. 6, 1977

[54] TESTING OF DIGITAL SYSTEMS
[75] Inventors: Thomas Henry Daugherty, Succasunna; Dale Eugene Stone, Cedar Knolls, both of N.J.
[73] Assignee: Bell Telephone Laboratories, Incorporated, Murray Hill, N.J.
[21] Appl. No.: 699,659
[22] Filed: June 24, 1976
[51] Int. Cl.² ............................................ H04J 3/14
[52] U.S. Cl. ............................................ 179/15 BF
[58] Field of Search .................. 179/15 BF, 175.3 R, 179/175.31 R, 175.2 D; 340/146.1 BE

[56] References Cited
U.S. PATENT DOCUMENTS

| | | | |
|---|---|---|---|
| 3,250,863 | 5/1966 | Pearce | 179/175.2 R |
| 3,407,274 | 10/1968 | Hribik | 179/175.2 R |
| 3,529,089 | 9/1970 | Davis | 179/15 AL |
| 3,678,222 | 7/1972 | Boehly | 179/175.31 R |
| 3,752,940 | 8/1973 | Santulli | 179/175.2 R |
| 3,829,628 | 8/1974 | Tripsas | 179/175.2 R |

Primary Examiner—Kathleen H. Claffy
Assistant Examiner—Joseph A. Popek
Attorney, Agent, or Firm—Robert O. Nimtz

[57] ABSTRACT

A digital subscriber loop transmission system is disclosed through which a number of remote subscribers are serviced with a smaller number of time division channels.

The digital transmission system includes an automatic channel testing unit which selects digital channels one at a time and in sequence for a series of automatic tests. Channels which fail these tests are withdrawn from service.

One such test involves ringing and automatic number identification circuits by means of which subscribers' telephones are rung and the off-hook subscriber on a two-party line is identified, both by the use of supervisory codes in the digital pulse stream. These supervisory codes are used to test the supervisory circuits themselves and, incidentally, large portions of the overall system.

10 Claims, 11 Drawing Figures

SERIAL LOOP TRANSMISSION SYSTEM

DATA STREAM

CHANNEL UNIT

RINGING DETECTOR

CHANNEL LOGIC CIRCUITS

FIG. 6 AUTOMATIC CHANNEL TEST (ACT) CIRCUITS

TEST RINGING AMPLIFIER

ANI TEST LOGIC

TEST SEQUENCER LOGIC

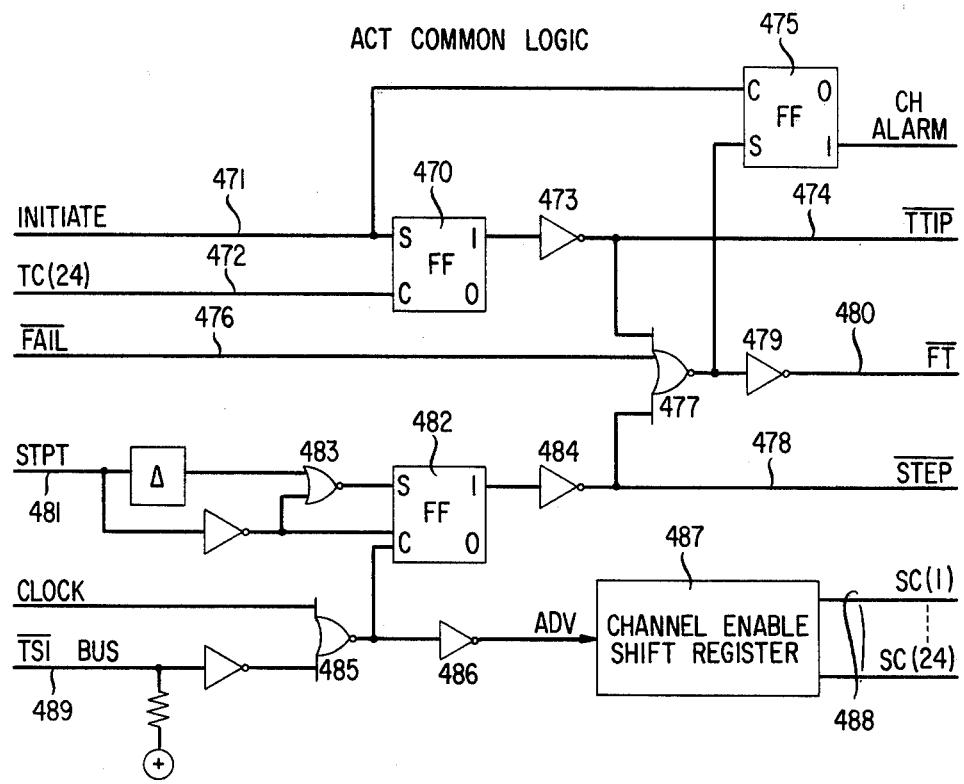
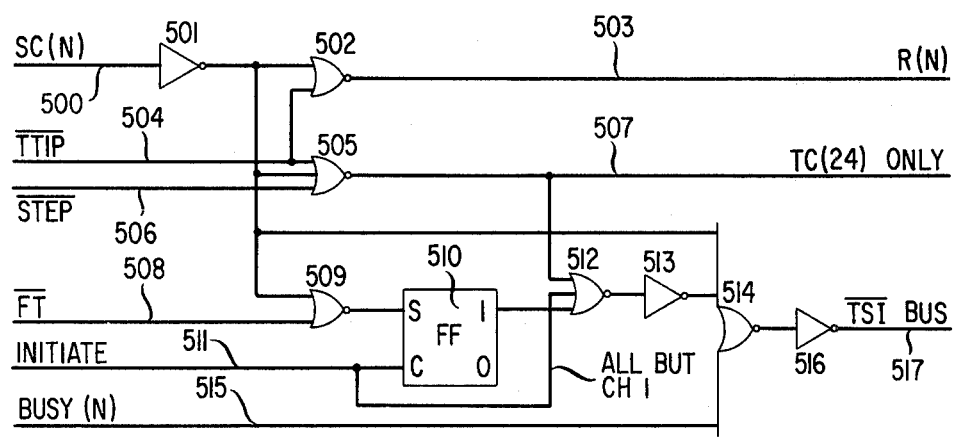

4,046,964

TESTING OF DIGITAL SYSTEMS

BACKGROUND OF THE INVENTION

1. Field of the Invention

This invention relates to digital transmission systems and, more particularly, to automatic testing arrangements for such systems.

2. Description of the Prior Art

Digital subscriber loop transmission systems are known which provide telephone service to a large plurality of subscribers over a limited number of wire pairs by using traffic concentration, time division multiplexing, and repeater technology. One such system is shown in C. G. Davis et al. U.S. Pat. No. 3,529,089, granted Sept. 15, 1970. A link testing arrangement for such a system is disclosed in J. E. Dail U.S. Pat. No. 4,002,847, granted Jan. 11, 1977.

Systems such as those disclosed above can save significant amounts of investment in telephone equipment by substituting the installation of advanced electronic terminal gear for laying new cable along expensive routes. Such systems have the characteristic however, of requiring the assignment of subscriber telephone conversations to any one of a number of time-divided channels in the system. A failure in any one of these channels can therefore result in an intermittent loss of service to all subscribers which is distributed among the total subscriber population on a more or less random basis.

In such a system it is therefore important to detect channel failures quickly and to remove faulty channels from service as rapidly as possible.

SUMMARY OF THE INVENTION

In accordance with the illustrative embodiment of the present invention, an automatic channel testing circuit is disclosed which is connected to each channel, one at a time and in sequence, during idle periods. A sequence of tests is performed for each channel and its performance during these testing conditions is measured. Any failure to meet desired performance criteria during such a testing sequence causes the channel to be locked out of service until repairs can be effected.

Two party fully selective ringing is accommodated in such a system by reserving two bit positions in the digital pulse stream to encode the ringing signals on the outgoing portion of the system. The same two bit positions on the return portion of the system can be utilized for identifying the party initiating a call (Automatic Number Identification). When a channel is idle in such a system, codes for that channel are circulated through the system and back to the central terminal without change. The automatic number identification (ANI) circuits and the ringing circuits can therefore both be tested by circulating codes throughout the loop which exercise the ringing detectors, the ANI detectors, the associated relays, and the entire digital transmission path.

It can thus be seen that, by arbitrarily imposing a normal signaling condition on a channel which is not in active service, it is possible to exercise the signaling channel and all of its associated equipment. As noted, the channel pulses for an idle channel are circulated out to the remote end of the system and directly back on the incoming leg without modification. Thus a complete circular testing path is available for all idle channels.

BRIEF DESCRIPTION OF THE DRAWING

In the drawing:

FIG. 10 is a detailed logic diagram of the common automatic channel test logic circuits used in the test circuits of FIG. 6; and FIG.11 is a detailed logic diagram of the automatic channel test per channel logic circuits used in the test circuits of FIG. 6.

DETAILED DESCRIPTION

Figures 1, 2:
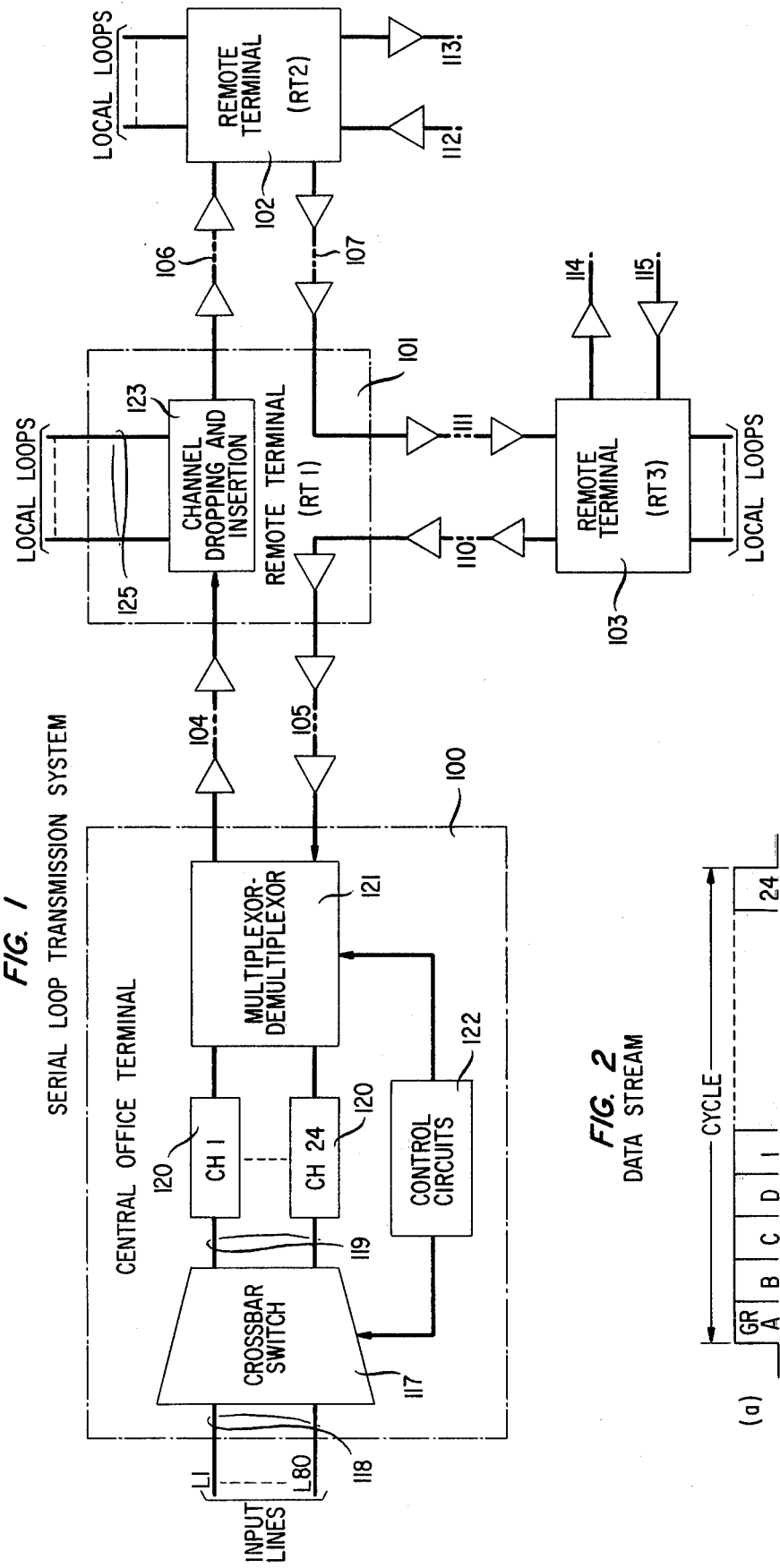
FIG. 1 is a general block diagram of a serial loop transmission system of the type with which the present invention finds use.
FIG. 2 is a graphical representation of a portion of the digital pulse stream circulating in the transmission system of FIG. 1.

The serial loop transmission system of FIG. 1 includes a central terminal 100 and a plurality of remote terminals 101, 102, and 103. Central terminal 100 is connected to remote terminal 101 by repeatered transmission lines 104 (outgoing) and 105 (incoming). Similarly, remote terminal 101 is connected to remote terminal 102 by repeatered lines 106 and 107. Remote terminal 103 is connected to remote terminal 101 by repeatered lines 110 and 111. Remote terminals 102 and 103 can be connected to yet other remote terminals by way of repeatered lines 112, 113, 114, and 115, and so forth.

It can be seen that the serial loop transmission system of FIG. 1 comprises a network of interconnected remote terminals identical to remote terminal 101, each of which provides serial connections to a plurality of other remote terminals. Each of remote terminals 101, 102, and 103 includes a channel dropping and insertion circuit such as circuit 123 in remote terminal 101. Circuit 123 detects signals on the incoming line and retransmits these signals on the outgoing lines. At the same time, the digital pulse stream received at the remote terminal is demultiplexed and appropriate channels are connected to the local loops 125. Signals from local loops 125 are multiplexed onto the serial pulse train by circuits 123 for transmission around the balance of the serial loop, replacing the dropped channel information.

The central office terminal 100 includes a crossbar switch 117 to which a plurality of input lines 118 are applied. In the illustrative embodiment, the number of input lines is eighty. The crossbar switch 117 connects any one of the eighty input lines 118 to any one of twenty-four output channels 119, each of which includes a channel unit 120.

The channel units 120 translate the analog voice signals from lines 118 into digital pulse streams which are applied to a multiplexer-demultiplexer circuit 121. Circuit 121 interleaves the pulse codes from channel units 120 into a common serial pulse stream for transmission on repeatered line 104. In addition to the data pulses representing the voice signals on line 104, there are a plurality of supervisory bits which are used by the system to set up and take down connections, and to signal for ringing, off-hook and other similar supervisory functions.

The returning serial pulse stream, after modification in the channel dropping and insertion circuits similar to circuit 123, is received on repeatered line 105 and demultiplexed in circuits 121 to deliver appropriate digital pulse streams to channel units 120. Control circuits 122 control both the crossbar switch 117 and the multiplexer and demultiplexer 121 to insure the proper interconnections of lines to channels. A more detailed description of the operation of the serial loop transmission system of FIG. 1 can be found in the patent of J. E. Dail, noted above.

In FIG. 2 there is shown a graphical representation of a portion of the serial pulse stream traversing the repeatered lines interconnecting the various terminals of the system of FIG. 1. Only one cycle of this pulse stream has been shown in FIG. 2 at (a). This cycle is made up of twenty-eight pulse groups identified as groups A, B, C, and D (channel assignment pulse groups) and groups 1 through 24 (data channel groups). Each of the channel assignment and data groups shown in the cycle of waveform (a) in FIG. 2 is made up of twenty-seven pulse positions as shown in (b) in FIG. 2. The first three time slots of each group (S1, S2, and S3) are supervisory bit positions which can be used to provide signaling information for the various telephone channels. The balance of the time slots in each group, identified as time slots 1 through 24, are used for one bit of the encoded speech for the like-numbered channels. Thus, time slot 1 is reserved for one bit of the digital representation of the speech encoded in the channel unit, 120 in FIG. 1, for channel 1.

Figure 3:
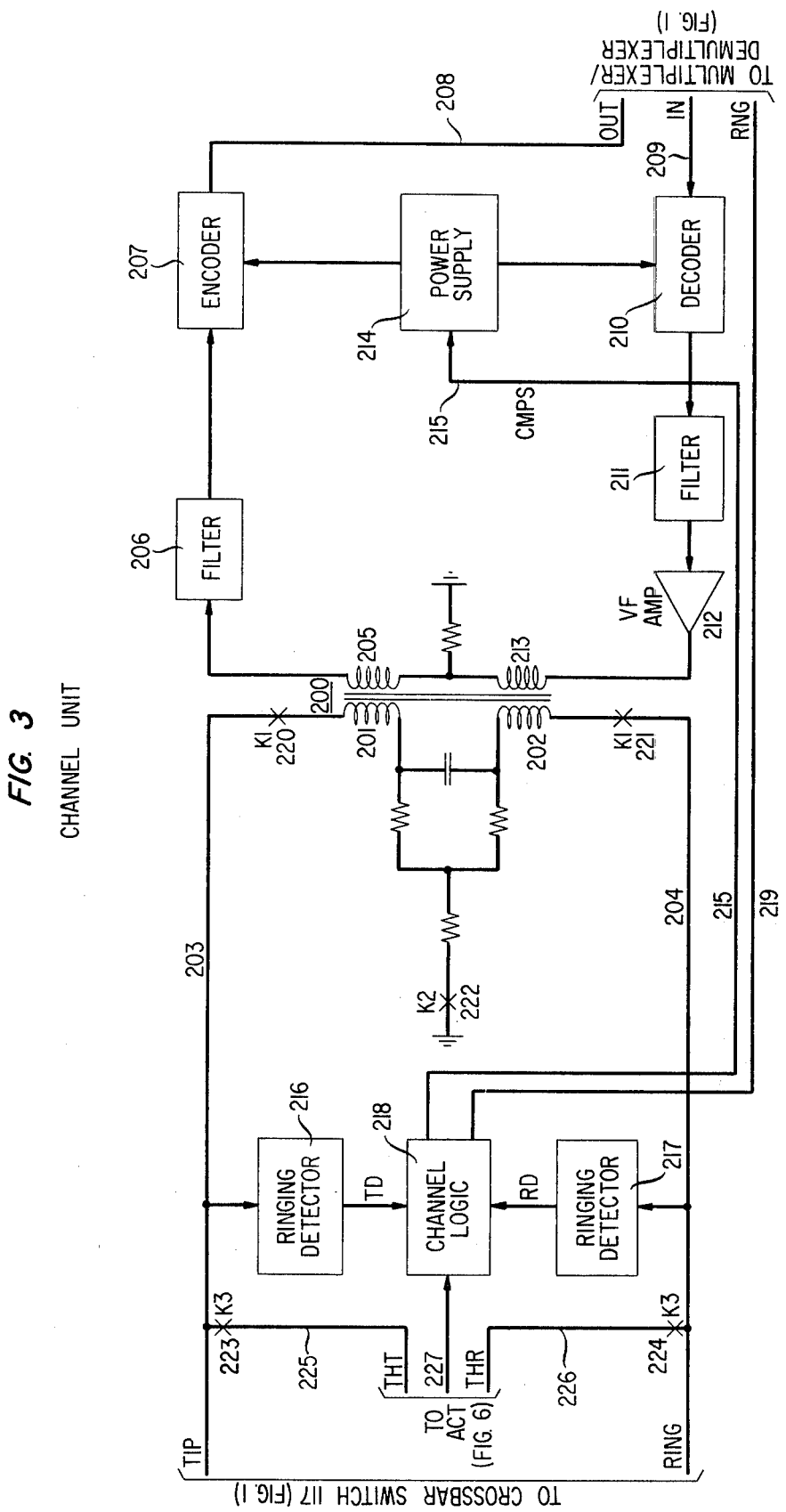
FIG. 3 is a more detailed block diagram of a channel unit useful at the central office terminal of the transmission system of FIG. 1 and including automatic channel testing arrangements in accordance with the present invention.

In FIG. 3 there is shown a detailed block diagram of one of the channel units 120 shown in FIG. 1. The channel unit comprises a hybrid transformer 200 having windings 201 and 202 across which analog signals from the crossbar switch 117 are applied via tip conductor 203 and ring conductor 204. The transmitting winding 205 of hybrid 200 is connected to a filter circuit 206 and thence to a pulse encoder circuit 207. Encoder 207 converts outgoing analog signals into a digital pulse train and may comprise a delta modulator such as that shown in T. H. Daugherty U.S. Pat. No. 3,621,396, granted Nov. 16, 1971. This pulse stream is applied via lead 208 to the multiplexer/demultiplexer circuit 121 in FIG. 1.

A received serial pulse train on lead 209 from the multiplexer/demultiplexer circuit 121 is applied to a decoder circuit 210 which may also take the form shown in the above-noted Daugherty patent. The reconstructed analog signal from decoder 210 is applied to filter 211 and thence to voice frequency amplifier 212. The filtered and amplified voice signal is applied to the receiving winding 213 of the hybrid transformer 200 and applied by way of conductors 203 and 204 to the crossbar switch 117.

A standard power supply 214 supplies operating power to encoder 207 and decoder 210. Power supply 214 is enabled by a CMPS control signal on lead 215 only when necessary, that is, only when the channel unit is in use.

A ringing detector 216 is connected to tip conductor 203 to detect ringing signals applied to the tip conductor at the central office, according to standard practice, in order to cause the ringer of the called party to operate. Similarly, a second ringing detector 217 is connected to the ring conductor 204 to similarly detect ringing voltage on the ring conductor. When a ringing signal is detected, one or the other, or both, of detectors 216 and 217 supply a control signal to channel logic circuit 218. These control signals are utilized by channel logic 218 to generate supervisory pulses on lead 219 which can be inserted into the multiplexed serial pulse train in appropriate ones of the supervisory bit position S1, S2, or S3 of the transmitted pulse train. These supervisory bits are thereby made available in the remote terminals to control the generation of ringing signals for application to the remote subscriber loop.

A pair of make contacts 220 and 221 must be closed to connect hybrid 200 to tip conductor 203 and ring conductor 204. Contacts 220 and 221 are operated by K1 relay 290 in FIG. 5 in response to received supervisory signals to repeat loop closure at the remote subscriber to the central office. A make contact 222 is provided which, when operated, draws a substantial longitudinal current through tip and ring conductors 203 and 204, respectively. This longitudinal current is utilized to repeat at the central office the automatic number identification current which is drawn by one party of a two-party ANI subscriber loop. A pair of make contacts 223 and 224 connect tip and ring conductors 203 and 204 to an automatic channel testing circuit (FIG. 6) via leads 225 and 226. Control leads 227 to channel logic circuits 218 are derived from the automatic channel testing circuits. These automatic testing circuits will be described in detail hereinafter in connection with FIG. 6.

Figure 4:
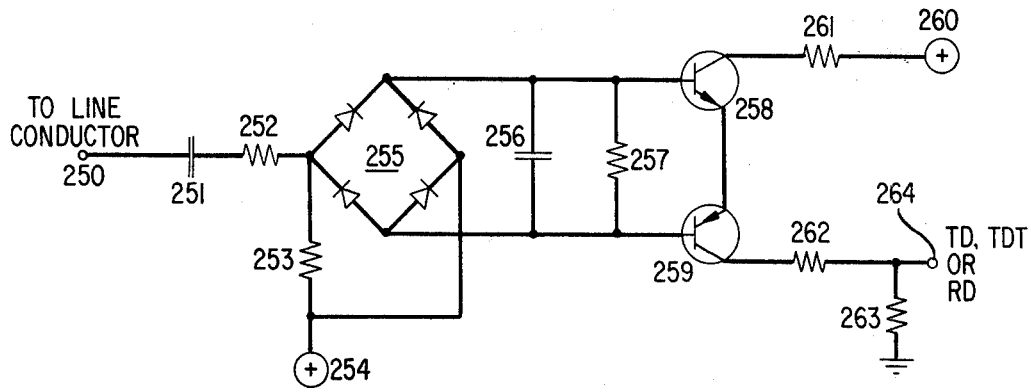
FIG. 4 is a detailed circuit diagram of a ringing detector useful in the channel unit of FIG. 3.

In FIG. 4 there is shown a detailed circuit diagram of a ringing detector which may be used as ringing detector 216 or ringing detector 217 in FIG. 3. One of the subscriber conductors (tip or ring) is connected to input terminal 250 and ringing signals present at terminal 250 are applied through capacitor 251 and across voltage divider 252-253 to positive voltage source 254. The voltage across resistor 253 is applied across diode rectifying bridge 255, the output of which is filtered by capacitor 256 and resistor 257. The resulting direct current is applied to the bases of transistors 258 and 259.

When the ringing voltage reaches a sufficient value, transistors 258 and 259 are both turned ON and draw current from source 260 through resistor 261 and voltage divider 262-263. An output voltage is taken from the midpoint of resistors 262 and 263 and applied to output terminal 264. A signal at terminal 264 indicates that a ringing signal has been detected. This output signal is utilized as will be discussed in connection with FIG. 5.

Figure 5:
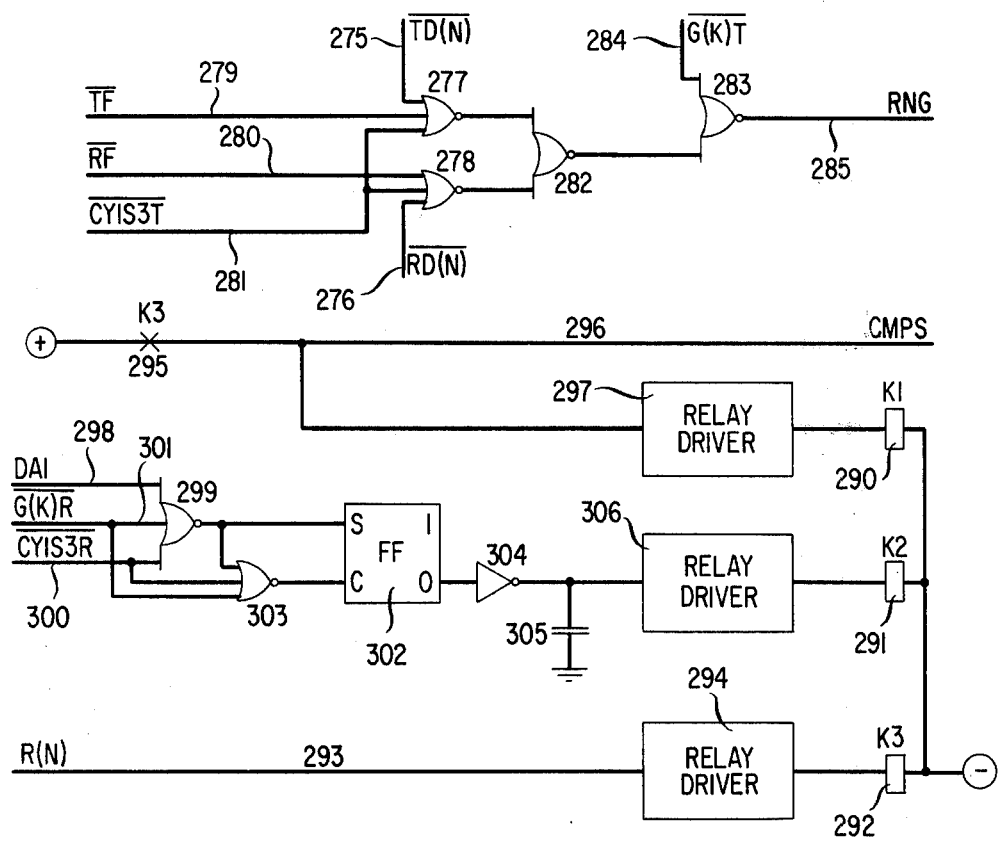
FIG. 5 is a detailed logic diagram of the channel logic circuits required in the channel unit of FIG. 3.

In FIG. 5 there is shown a detailed logic diagram of the channel logic circuits 218 of FIG. 3. The circuits of FIG. 5 comprise all of the logic contained in each channel unit which is necessary to control the automatic testing process. In FIG. 5, the outputs of ringing detectors 216 and 217 of FIG. 3 appear on leads 275 and 276, respectively. The signals are applied to NOR gates 277 and 278, respectively, to which there are also applied timing pulses intended to force this ringing detection information into particular time slots of the bit stream depicted in FIG. 2. Specifically, the S3 supervisory time slot of each group of cycle 1 (CY1S3T) is used on the outgoing link to indicate that a ringing signal must be applied to a particular subscriber at a remote terminal. The even numbered frames are used to signal ringing on the tip conductor and the odd numbered frame is used to indicate ringing on the ring conductor. Thus a tip frame (TF) signal on lead 279 is applied to NOR gate 277 while a ring frame (RF) signal on lead 280 is applied to NOR gate 278. A properly time slotted pulse on lead 281 is applied to both gates 277 and 278.

The outputs of NOR gates 277 and 278 are applied to NOR gate 282, thus combining the ringing supervisory signals on a single lead which is introduced into NOR gate 283. NOR gate 283 combines this ringing signal with an appropriate group pulse (G(K)T) on lead 284 which identifies the proper channel for which the ringing signals are intended. As can be seen in FIG. 2, this produces on output lead 285 an RNG ringing signal in time slot S3 of the group corresponding to the appropriate channel. Similar supervisory bits in other groups provide similar information for the other channels.

A group of relays 290, 291, and 292 are used to control the test connections for the particular channel unit. A channel selecting signal R(N) on lead 293 is applied to relay driver circuit 294 to operate K3 relay 292. When so operated, relay 292 closes contact 295 to provide a CMPS signal on lead 296 which enables power supply 214 in FIG. 3 to supply power to encoder 207 and decoder 210. The channel unit is thus fully enabled to receive data signals from the transmission facility and deliver data signals to that facility.

Contact 295 also applies a signal to relay driver 297 to operate K1 relay 290. As can be seen in FIG. 3, K3 contacts 223 and 224 of relay 292 connect the channel unit hybrid 200 to the automatic test circuits, thereby providing a direct current to the channel unit hybrid. This completes the test enablement of the channel unit, providing both ac and dc enablement of the channel unit.

In order to detect supervisory signals returning in the data stream, this data stream (DAI) appearing on lead 298 is supplied to NOR gate 299. Also supplied to NOR gate 299 are timing signals on leads 300 (CY1S3R) and 301 (G(K)R) defining the supervisory bit time slot (lead 300) and the group (lead 301) corresponding to the channel unit. The output of gate 299 sets flip-flop 302 and is also combined with the timing signals in gate 303 to clear flip-flop 302 when the ringing supervisory bit disappears.

The "0" output of flip-flop 302 is inverted by inverter 304 and averaged by capacitor 305 to operate relay driver 306 only so long as both odd and even supervisory bits are present in the received data streams. Relay driver 306 operates K2 relay 291 to close K2 contacts 222 in FIG. 3, indicating a successful circulation of the supervisory bits around the looped transmission system. As described in connection with FIG. 3, this causes a longitudinal impedance to be placed from the tip and ring conductors to ground in the channel unit. This impedance is of a magnitude sufficient to load the ringing amplifier 342 (FIG. 6) and thus bring the input to the ringing detectors 216 and 217 below their thresholds of detection, thereby terminating ringing detection.

Figure 6:
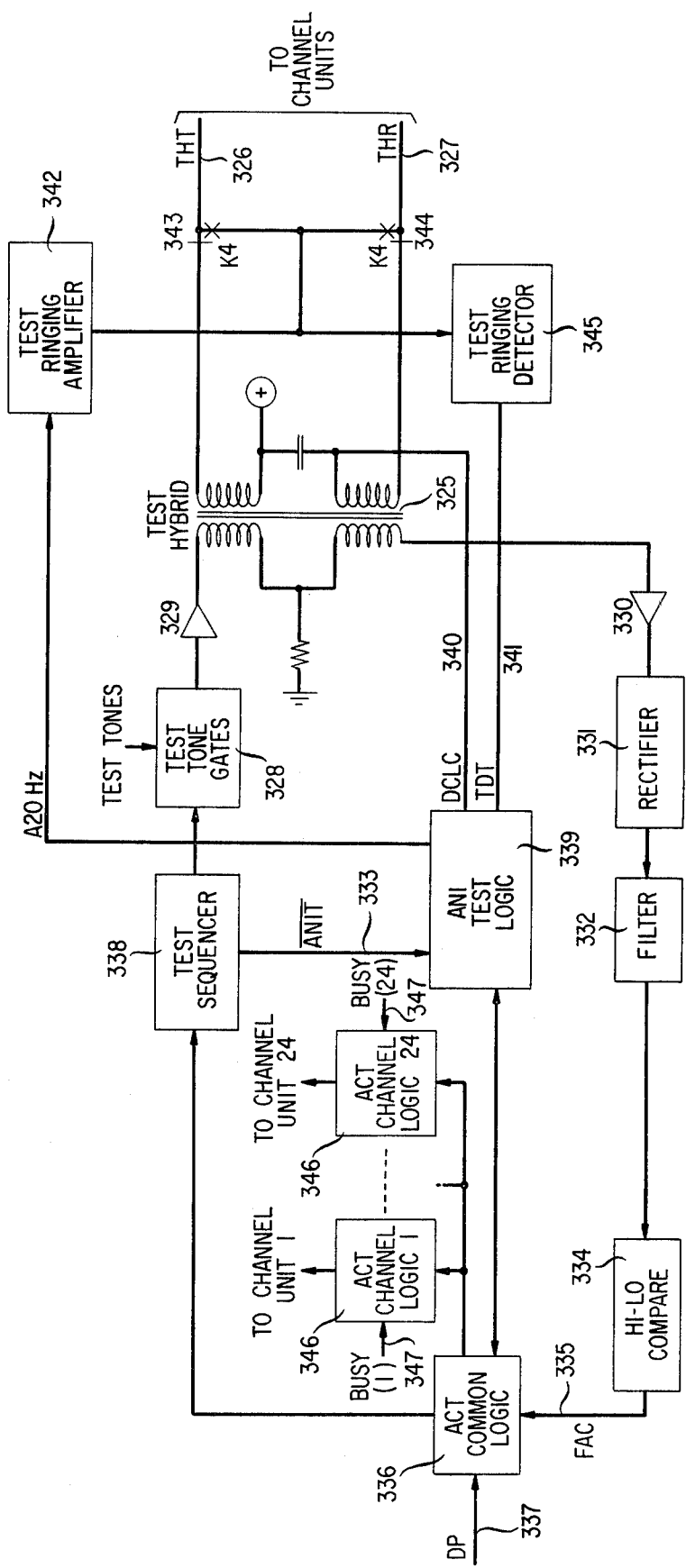
FIG. 6 is a general block diagram of the automatic channel testing circuits to be connected to the channel units of FIG. 3.

In FIG. 6 there is shown the automatic channel test (ACT) circuits which are used to systematically test each of the channels in the transmission system of FIG. 1. The ACT circuits of FIG. 6 comprise a test hybrid 325 which is connected by way of leads 326 and 327 to any selected one of the channel units by way of K3 relay contacts corresponding to contacts 223 and 224 in FIG. 3. Test hybrid 325 is used to apply test tones from test tone gates 328 and amplifier 329 to the selected channel unit for transmission through the serial loop transmission system. These test tones are returned to test hybrid 325 and, via amplifier 330, to rectifier 331, filter 332, and a comparator circuit 334. The returned test tones are therefore rectified and filtered to provide dc signals representing the levels of the returned test tones. The comparator circuit 334 determines whether the returned tones fall between a low threshold value and a high threshold value and provides on output lead 335 an FAC signal indicating a test failure when the returned signal falls outside of this acceptable band of values. This failure indication is applied to ACT common logic circuits 336.

An automatic channel test is initiated by a starting signal on lead 337 which may comprise a manual signal or a timing signal generated at regular intervals (for example, on a daily basis) to provide continuing surveillance of the service capabilities of each of the channels. ACT common logic circuits 336 control a test sequencer 338 which determines the sequence of tests to be performed on each channel unit. Some of these tests include the application of a variety of test tones through test tone gates 328 to the connected channel unit. At least one of these tests is a test of the supervisory bits (in particular, the Automatic Number Identification, ANI, bits) of the system. This test is carried out under the control of ANI test logic 339.

ANI test logic 339 responds to the $\overline{\text{ANIT}}$ enable signal on lead 333, a direct current indication (DCLC) on lead 340, and a ringing indication (TDT) on lead 341 to control the application of a test ringing signal by amplifier 342 to the channel unit under test. These ringing signals are connected to the channel unit by K4 transfer contacts 343 and 344 which transfer the channel unit from the test hybrid 325 to the ringing amplifier 342. The channel unit is also connected to test ringing detector 345 to confirm the application of ringing signals to the channel unit and to detect the response of the connected channel unit.

ACT common logic 336 also controls a plurality of ACT channel logic circuits 346, one for each channel of the transmission system of FIG. 1. These channel logic circuits 346, together with the logic to be described in connection with FIG. 10, are utilized to select idle channels in sequence for testing and are also under the control of channel busy signals on leads 347, one for each channel. In this way, a test sequence can proceed through all of the idle channels and skip those channels which are currently busy, thus preventing service interruptions.

The operation of the automatic channel test circuits of FIG. 6 may be more readily understood in connection with the detailed test circuits shown in FIGS. 7 through 11.

Figure 7:
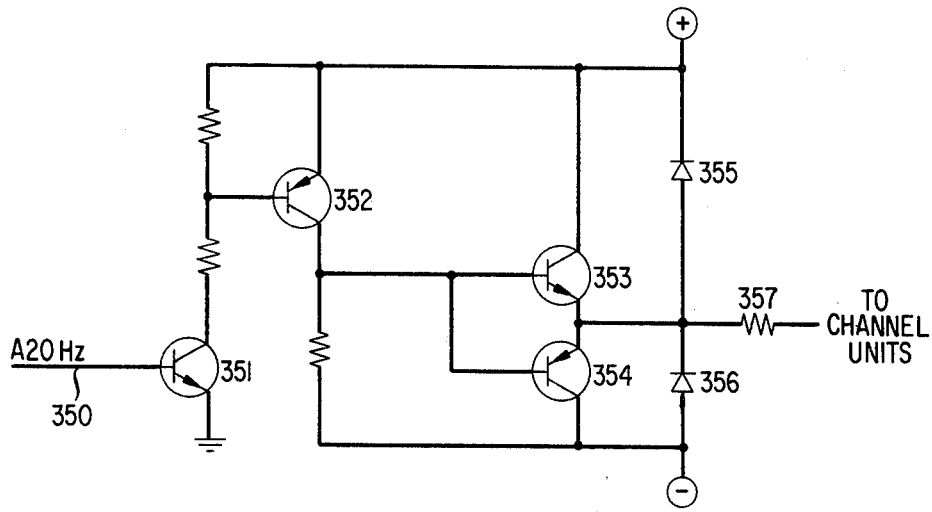
FIG. 7 is a detailed circuit diagram of a test ringing amplifier circuit useful in the automatic channel testing circuits of FIG. 6.

In FIG. 7, there is shown a detailed circuit diagram of the test ringing amplifier 342 of FIG. 6. This amplifier is under the control of a 20 Hz ringing signal on lead 350 which is applied to transistor 351. This ringing signal is amplified in three stages by transistors 351 and 352 and by complementary pair 353 and 354. Diodes 355 and 356 provide inverse voltage protection for transistors 353 and 354, respectively. The amplified ringing signal is supplied through resistor 357 to the connected channel unit as shown in FIG. 6.

Figure 8:
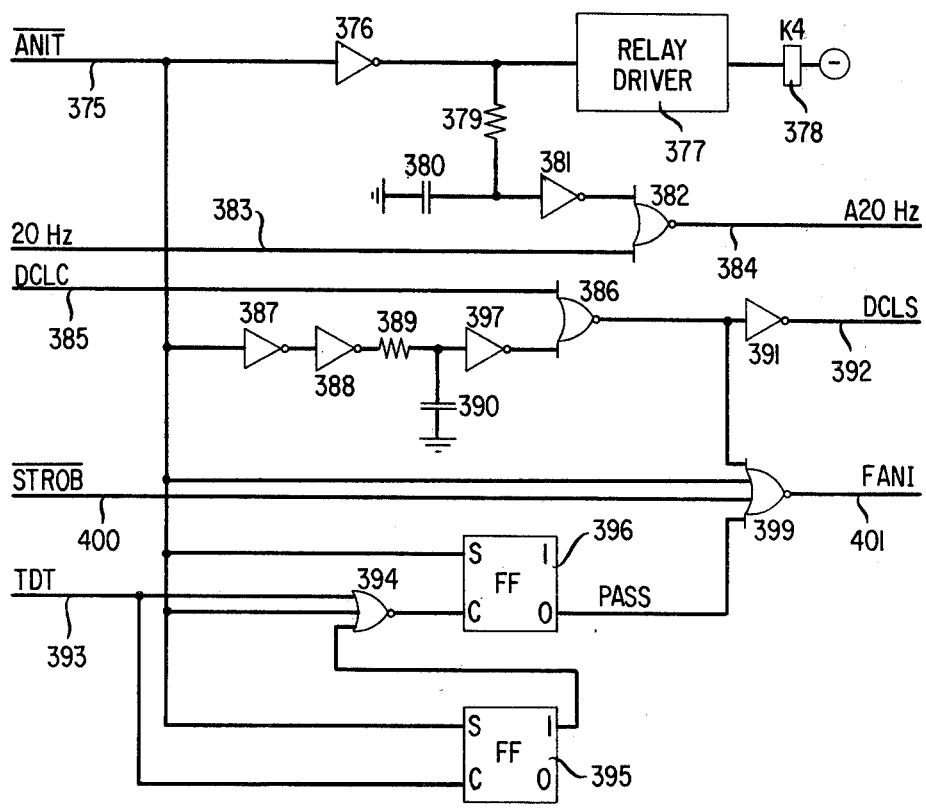
FIG. 8 is a detailed logic diagram of the automatic number identification (ANI) test logic circuits used in the test circuits of FIG. 6.

In FIG. 8, there is shown a detailed logic diagram of the ANI test logic 339 of FIG. 6. An $\overline{\text{ANIT}}$ enabling signal on lead 375, from the test sequencer 338 of FIG. 6, initiates an ANI test sequence. This $\overline{\text{ANIT}}$ enabling signal on lead 335 is supplied through inverter 376 to relay driver 377 to operate K4 relay 378. As shown in FIG. 6, K4 relay 378 operates K4 transfer contacts 343 and 344 to connect the channel unit under test to ringing amplifier 342 and ringing detector 345.

The $\overline{\text{ANIT}}$ enabling signal on lead 375 is also supplied by way of resistor 379, capacitor 380, and inverter 381 to NOR gate 382. This enabling signal is combined with a standard 20 Hz ringing signal on lead 383 to supply the input to the test ringing amplifier of FIG. 7 on lead 384.

A signal on lead 385 indicates that a direct current is flowing through the test hybrid 325 of the ACT circuits of FIG. 6. This indicates that the channel unit is connected to the ACT circuits and has been dc enabled by the operation of K1 contacts 220 and 221 in FIG. 3. Thus, the signal on lead 385 indicates that a channel unit has been selected and energized and is now ready for an ANI test.

The DCLC signal on lead 385 is also combined in NOR gate 386 with a delayed $\overline{\text{ANIT}}$ enabling signal from lead 375 through inverters 387 and 388, resistor 389 and capacitor 390. The combined signal from NOR gate 386 is inverted by inverter 391 to provide a DCLS signal on lead 392. The function of the DCLS signal is to repeat the DCLC signal and to maintain an indication of dc continuity when the DCLC signal is lost by the operation of K4 contacts 343 and 344 (FIG. 6). Resistor 389 and capacitor 390 prevent transient signals on lead 392 at the end of a test period. The DCLS signal will be used as described in connection with FIG. 9 to initiate the ANI test.

Flip-flops 396 and 397 are enabled by an $\overline{\text{ANIT}}$ signal on lead 375. The TDT output of the test ringing detector 345 of FIG. 6 is available on lead 393 and is supplied to NOR gate 394 along with the "1" output of flip-flop 395 and the $\overline{\text{ANIT}}$ enabling signal on lead 375. The output of flip-flop 395 clears flip-flop 396 and flip-flop 395 is cleared by the detected TDT ringing signal on lead 393.

The output of NOR gate 386 is combined in NOR gate 399 with the "0" output of flip-flop 396, the $\overline{\text{ANIT}}$ signal on lead 375, and a clock strobe pulse at the end of the $\overline{\text{ANIT}}$ enabling period on lead 400 to indicate a failure of the ANI test (FANI) on lead 401. That is, unless a ringing signal is detected and thereafter ceases before the end of the $\overline{\text{ANIT}}$ enabling pulse on lead 375, it is presumed that an error has occurred and hence a failure is inidicated for that channel. This failure signal on lead 401 is combined with the FAC failure signal on lead 335 of FIG. 6 so that any failure in any of the channels can be used to give an alarm. This procedure will be described in more detail in connection with the following figures.

Figure 9:
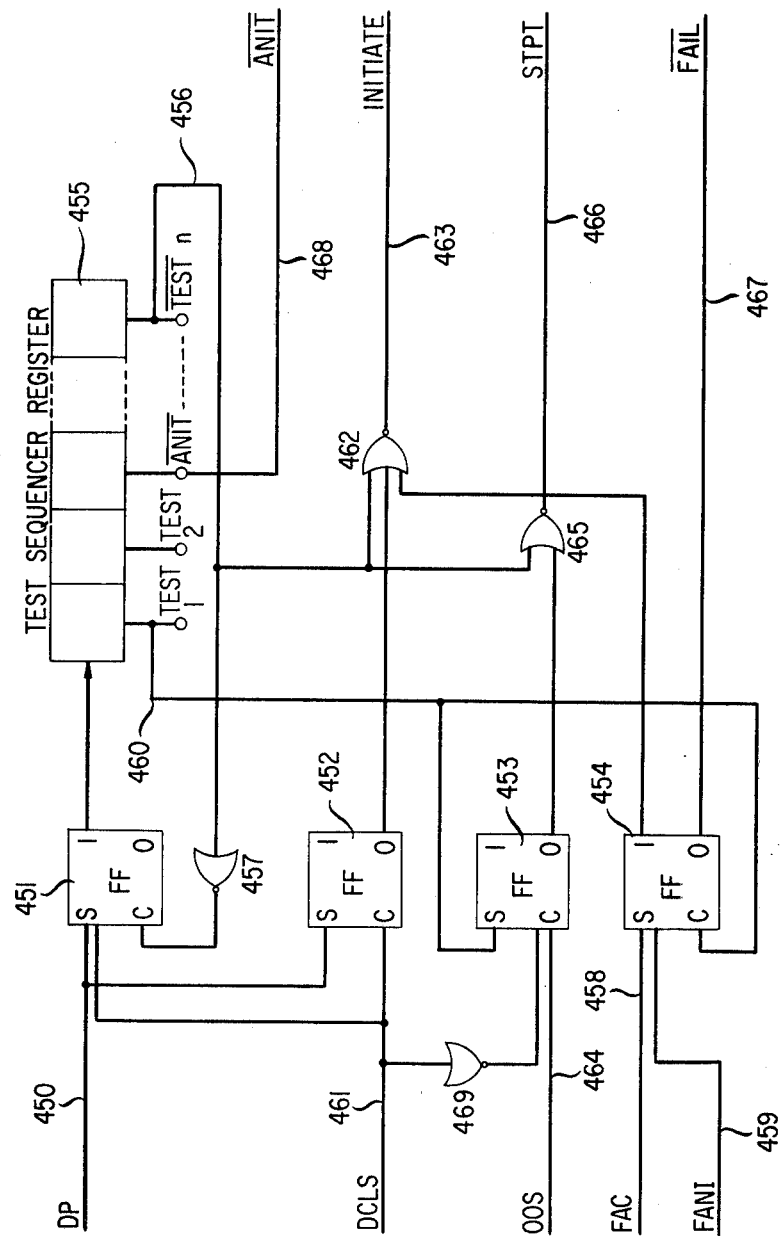
FIG. 9 is a detailed logic diagram of the test sequencer logic used in the test circuits of FIG. 6.

In FIG. 9 there is shown a detailed circuit diagram of the test sequencer logic for operating the test sequencer 338 shown in FIG. 6. This logic consists primarily of four flip-flops 451, 452, 453, and 454 and a test sequencing register 455. Flip-flop 451 is set at some regular interval, for example, daily, by a pulse on lead 450. Alternatively, a manual switch can be used to provide the pulse on lead 450 to inaugurate a testing sequence manually. The "1" output of flip-flop 451 enables sequencer 455 to step through its stages. When the last stage is reached, a signal on lead 456 is connected through inverter 457 to clear flip-flop 451 and terminate the sequencing process. The test sequence register 455 is then disabled.

Test sequence register 455 includes a plurality of stages, one for each separate test to be completed for each line. As noted in connection with FIG. 6, some of these tests involve gating test tones into the channel unit under test, using test tone gates 328 in FIG. 6. Test tone gates 328 can be enabled by selectively cross-connecting the outputs of the various stages of register 455 to the appropriate test tone gates.

At least one stage of register 455 provides a testing sequence for the supervisory pulse positions of the multiplex transmission system. In FIG. 9, this testing sequence is controlled by an $\overline{\text{ANIT}}$ signal on lead 468, connected to the third state of register 455. A signal on lead 468 initiates the supervisory channel test as described in connection with FIG. 8.

Flip-flop 454 is set by a FAC failure indication on lead 458, indicating a failure on one of the tone tests as determined by comparator circuit 334 in FIG. 6, or by a FANI signal on lead 459, indicating the failure of the ANI supervisory test. ANI failure is indicated by a signal on lead 401 in FIG. 8. Flip-flop 454 is cleared by a signal on lead 460 at the beginning of each testing sequence in preparation for subsequent failure indications.

Flip-flop 452 is a self-testing flip-flop which is set by the pulse on lead 450 and cleared when the first channel unit is being tested, by a signal on lead 461, derived from lead 392 in FIG. 8 and indicating direct current continuity through the test hybrid to the channel unit under test. The outputs of flip-flops 452 and 454 are combined with the output of test sequencer 455 on lead 456 in NOR gate 462. The INITIATE output of NOR gate 462 on lead 463 is used to initiate the channel tests.

Flip-flop 453 is provided to control the stepping between successive channels after completing tests for the previous channel. Flip-flop 453 is set by a signal on lead 460, indicating the beginning of a testing sequence, and is cleared by a signal on lead 461, inverted in NOR gate 469, indicating that dc continuity has been lost during testing or after test completion for a particular channel unit. Flip-flop 453 can also be cleared by a signal on lead 464 indicating that the multiplex system is out of synchronization and hence channel testing can no longer be carried out. The output of flip-flop 453 is combined in NOR gate 465 with the output of test sequencer 455 on lead 456 to provide an STPT output on lead 466 which serves to step from channel to channel after each testing sequence. Flip-flop 453 therefore insures that the test sequence cannot be advanced to the next channel unit until valid test results are obtained.

A test sequence begins with a pulse on lead 450 setting flip-flops 451 and 452. The first time sequencer 455 goes through its steps, the automatic channel test circuits test themselves by being looped back through the test hybrid 325 of FIG. 6. At the end of this self-testing sequence, if flip-flop 454 has not been set by a self-test failure indication, INITIATE lead 453 is enabled to start the test sequence on channel 1. If a self-test failure does occur and flip-flop 454 is set, the INITIATE pulse on 453 is not generated and instead a $\overline{\text{FAIL}}$ signal appears on lead 467. All further testing is disabled until the next enabling pulse on lead 450 is received.

As each channel unit is connected to the automatic testing unit, the direct current flow from the channel unit to the test hybrid causes lead 461 to go high (see lead 392 in FIG. 8), clearing flip-flop 452 and setting flip-flop 451. The test sequencer 455 is again enabled by flip-flop 451. Flip-flop 453 is set at the beginning of each sequence by a signal on lead 460 and reset by an OOS signal on lead 464 or loss of the DCLS signal on lead 461, inverted in inverter 469. The signal on lead 466, as will be described later, is used to cause the test connection to be stepped to the next idle channel unit.

In FIG. 10 there is shown a detailed circuit diagram of the common logic 336 in the automatic channel testing circuit of FIG. 6. In FIG. 10, flip-flop 470 is set by an INITIATE pulse on lead 471 from FIG. 9 and is cleared upon completion of the test sequence for the last channel (channel 24), indicated by a TC(24) signal on lead 472. The output of flip-flop 470 is supplied through inverter 473 to test in progress (TTIP) lead 474 which remains low until all the channels have been tested.

The INITIATE signal on lead 471 also clears flip-flop 475 which is used to provide a common failure alarm indication for all channels. A FAIL signal on lead 476 is supplied to NOR gate 477 together with a TTIP signal on lead 474 and a STEP signal on lead 478. The output of NOR gate 477 is used to set flip-flop 475 and thus indicate a channel failure. This failure signal is also supplied through inverter 479 to lead 480 to provide a failure indication to the channel logic. The output of flip-flop 475 can be used to operate an alarm.

An STPT step test pulse on lead 481 from FIG. 9 causes the next nonbusy channel unit to be selected. The leading edge of the step test pulse sets flip-flop 482 through NOR gate 483, causing the STEP output on lead 478 to go low. Lead 478 is connected to the "1" output of flip-flop 482 through inverter 484. Flip-flop 482 is reset by the STPT pulse on lead 481 going low or by the first clock pulse to pass NOR gate 485. Clock pulses are applied through NOR gate 486 to advance channel enable shift register 487. Shift register 487, under control of advance pulses from NOR gate 486, successively steps through twenty-four output leads 488 to enable each of the channel units in succession.

Clock pulses are inhibited at NOR gate 485 by trunk scan inhibit (TSI) signals on bus 489 derived as will be described in connection with FIG. 11. In general, however, clock pulse inhibition takes place whenever a channel is idle, permitting testing of that idle channel. If a channel is busy, NOR gate 485 is enabled to permit another clock pulse to advance register 487 to the next channel; this process is continued until an idle channel is found.

In FIG. 11 there is shown a detailed circuit diagram of the ACT channel logic 346 shown in block form in FIG. 6. In FIG. 11, an SC(N) channel scanning signal from channel enable shift register 487 (FIG. 10) is supplied on lead 500 through inverter circuit 501 and NOR gate 502 to lead 503. The signal on lead 503 is used in FIG. 5 to initiate channel enablement for the selected channel. The other input to NOR gate 502 is from TTIP lead 504 generated on lead 474 in FIG. 10. The signal on lead 504 is also applied to NOR gate 505 together with the output of inverter 501 and a STEP signal on lead 506, indicating the completion of a stepping sequence. The output of NOR gate 505 is supplied to lead 507 only for the channel 24 ACT channel logic and is used as described in FIG. 10 to terminate the testing procedure.

An FT failure indication on lead 508 is combined in NOR gate 509 with the output of inverter 501 to set flip-flop 510, indicating that a failure has occurred during the testing of this channel. Flip-flop 510 is initially cleared by an INITIATE pulse on lead 511. The "1" output of flip-flop 510 is applied to NOR gate 512, together with the output of NOR gate 505. This signal is inverted by inverter 513 and applied to NOR gate 514. NOR gate 514 combines this signal with an inverted SC(N) scan pulse from inverter 501 and a busy signal on lead 515. The output of NOR gate 514 is inverted by inverter 516 to provide a TSI test scan inhibit signal on bus 517, precluding assignment of this channel. Bus 517 is common for all of the ACT channel logic circuits and is supplied in FIG. 10 on lead 489.

The connection of INITIATE lead 511 to NOR gate 512 is omitted in the ACT channel logic for channel 1 to force the channel enable shift register 487 to recycle all the way to channel 1 before initiating any test sequences.

There has been described an automatic testing arrangement for the channels of a pulse multiplexed transmission system. Tones can be used to test the modulators and demodulators of the system while simulated supervisory signals are initiated to test the supervisory bit positions in the transmission system. It will be noted that, for those channels which are not busy, i.e., not assigned to a particular subscriber's use, the serial loop transmission system of FIG. 1 circulates these test signals throughout the entire transmission system and returns them to the central office terminal for detection in the channel testing circuits. These tests are therefore effective to test both the per channel circuits of the system as well as the common transmission facilities throughout the system.

While the test tones exercise the analog and analog/digital interfaces of the system, the ANI testing circuits test particular bit positions in the digital pulse stream which are reserved for supervisory signaling. The analog tests are quite tolerant of bit errors in the bit stream, but the supervisory bit stream is less tolerant of bit errors and requires the presence of particular bit values at particular time slots in order to pass this test.

What is claimed is:

1. An automatic channel testing system for bilateral multiplex pulse transmission systems having a plurality of data channels and at least one supervisory channel, said testing system comprising
   a common test signal source including a supervisory signal source;
   a common test signal detector including a supervisory signal detector;
   means for sequentially connecting said test signal source and said test signal detector to each of said channels;
   means included in each said channel for converting said test signals to digital pulses for transmission on said transmission system; and
   means included in each said channel for converting received digital pulses from said transmission system into test signals.

2. The automatic channel testing system according to claim 1 further including means for inhibiting the testing of busy channels.

3. The automatic channel testing system according to claim 1 wherein said supervisory signal source comprises a source of telephone ringing signals.

4. The automatic channel testing system according to claim 1 wherein said test signal source includes a plurality of sources of test tones.

5. In a multiplex pulse transmission system having groups of pulse positions reserved for communications channels and other groups of pulse positions reserved for supervisory signaling, a common test circuit for said system comprising
- separate sources of test signals for said communications channels and said supervisory signaling;
- means for sequentially connecting said common test circuit to each said communication channel; and
- means for sequentially connecting said separate sources to each said connected communication channel.

6. The common test circuit according to claim 5 wherein
- said communication channel test signals include test tones within the frequency band of said communication channel, and
- said supervisory signaling test signals include a telephone ringing signal.

7. The common test circuit according to claim 5 wherein said sequential connecting means includes means for connecting only idle channels.

8. A testing circuit for a bilateral pulse transmission system having a plurality of supervisory signal time slots used for a first signaling function on the outgoing path of said system and using the same plurality of supervisory signal time slots for a second signaling function on the return path of said system, said testing circuit comprising
- a source of supervisory signals for said first signaling function;
- a detector of supervisory signals for said second signaling function; and
- means responsive to the presence of signals from said source and the absence of an output from said detector for indicating a failure in said transmission system.

9. The testing circuit according to claim 8 wherein said source of supervision signals comprises a telephone ringing signal source.

10. The testing circuit according to claim 8 wherein said detector comprises an automatic telephone number identification detector.

* * * * *